United States Patent Office 2,847,411
Patented Aug. 12, 1958

2,847,411
PROCESS FOR PRODUCING HYDROXYETHOXY-CELLULOSE

Reid Logan Mitchell, Robert Friedrich Bampton, and William Hughes Wadman, Shelton, Wash., assignors to Rayonier Incorporated, Shelton, Wash., a corporation of Delaware No Drawing. Application February 15, 1955
Serial No. 488,438

2 Claims. (Cl. 260—231)

This invention relates to hydroxyethoxycellulose, commonly known as hydroxyethylcellulose, and has for its object the provision of an improved process for the production of hydroxyethylcellulose suitable for yarns, and clear strong films suitable for wrapping packages and for other purposes. The process of our invention comprises the conversion of cellulose to alkali cellulose, the reaction of alkali cellulose with ethylene oxide, and the formation of filament-forming or film-forming solutions for conversion into filaments or clear tough films of hydroxyethylcellulose.

Cellulose itself is not appreciably soluble in water or in dilute aqueous alkali solutions. Progressive substitution of hydroxyethyl groups increases the hydrophilic characteristics of cellulose making it first alkali-soluble at a low degree of substitution and eventually water-soluble at a higher degree of substitution. The higher the level of substitution the greater the water solubility, and the change from insoluble to alkali-soluble to water-soluble involves only a relatively small change in the amount of substitution.

The production of hydroxyethylcellulose from alkali cellulose by substitution of ethylene oxide has been known for years but continues to be accomplished in operations yielding products with a nonuniform degree of substitution having limited uses. Hydroxyethylcellulose now being commercially produced yields solutions that are unsuitable for the production of films or filaments for three main reasons: (1) the solutions have exceedingly poor filtering properties; (2) the average level of substitution of ethylene oxide is too high; and (3) the substitution is not uniform.

The higher the degree of substitution the more readily soluble the fibrous hydroxyethylcellulose becomes and, if the substitution is suitably uniform, the more readily filterable the resulting solutions. However, the higher the degree of substitution the more difficult it is to reprecipitate the dissolved hydroxyethylcellulose into a usable form and the more highly swollen, weak and slimy is the resulting precipitated product. The greater weakness of highly substituted products is not only apparent in the wet state but in the dried finished state as well, because the substituted groups interfere to a certain extent with the normal ordered structure of the cellulose while it is being precipitated. High swelling hydroxyethylcellulose is not only undesirable because of its low strength, but because it increases the difficulties in washing and drying.

This invention is based on our conception of the critical amount of substitution of ethylene oxide necessary to form a solution that will filter effectively without being water-soluble. By expressing the amount of substitution of ethylene oxide reacted with 100 parts of cellulose on a percentage basis, we then may define ranges somewhat as follows: 0%–2% substitution is not soluble enough to form filterable solutions; 2%–8% substitution covers the workable range for alkali solubility; while substitution above 8% is too water-soluble and is difficult to recover for filament or film manufacture. For example, at a level of, say 3% to 4% substitution, if only a few fibers are substituted, say from 0% to 2%, these will ruin solution filterability, while if only a few fibers are oversubstituted, say from 8%–10%, these are water-soluble and will result in a weak, slimy film, and in a loss of material if the substitution is higher than about 10%. We have solved the difficult problem presented by two conflicting tendencies: solubility and precipitatability.

We have discovered certain critical conditions in the reactions necessary to convert cellulose to hydroxyethylcellulose that can be spun into filaments and cast into clear strong films. Study of the reaction of ethylene oxide with alkali cellulose has shown efficiencies of conversion of about 50%. Therefore, a substitution level of 5% as quoted above actually requires an input of about 10% ethylene oxide based on the cellulose, 5% going to ethylene glycol through the competing reaction with water. We have discovered that it is not merely desirable to react a given mass of cellulose fibers with an aqueous solution of sodium hydroxide (steeping liquor) to achieve an over-all level of conversion to alkali cellulose as an initial step in forming hydroxyethylcellulose. We have found that it is necessary to contact and react the individual fibers of cellulose with steeping liquor of uniform sodium hydroxide content and that, unless all the fibers are converted at about the same level, it is impossible to effect the critical substitution of ethylene oxide. We have also found that, notwithstanding uniform conversion to alkali cellulose, it is impossible to effect a uniform substitution of ethylene oxide within the critical limits that will result in a filterable solution on the one hand and a lack of water solubility on the other unless the reacting conditions are carefully controlled to effect uniform substitution.

Ethylene oxide may be reacted with alkali cellulose to substitute from 0% to 100% of the free hydroxyl groups, depending on the availability of the reactants at a given point. When there is a large mass of cellulose and a small amount of ethylene oxide, the ethylene oxide will exhaust itself in reacting with the most available cellulose resulting in a localized high percentage substitution. While the average percentage substitution could fall within the critical range, the lack of uniform substitution will result in a solution unsuitable for filaments or films. We have found that even with uniformly converted alkali cellulose, it is necessary to control the conditions in the reaction with ethylene oxide so that practically all of the particles or fibers of alkali cellulose are contacted with the ethylene oxide at substantially the same concentration, temperature, and for the same time to the end that from 2% to 10%, advantageously about 2% to 5%, of ethylene oxide is actually combined with the alkali cellulose. Our invention is, accordingly, based upon the discovered fact that both alkalization of the cellulose and its etherification with ethylene oxide must be carried out in a critically uniform manner to provide a product having a selected predetermined level of substitution.

One important factor in the control of uniformity has to do with the uniformity of the cellulose chain lengths. While cotton linters are a satisfactory form of cellulose, many wood pulps are of such variable chin length that suitably uniform hydroxyethylcellulose is difficult to prepare. However, certain wood pulps having a relatively uniform chain length, notably Rayocord X or Cordenier, are especially satisfactory for use in the invention and give products comparable to those made from cotton linters.

In one form of the invention, a continuous sheet of cellulose pulp, preferably dry, is passed through a steeping operation in which caustic stepping liquor is forced through the sheet of cellulose to contact all the fibers with liquor having the same concentration of sodium hydroxide, and the sheet is then treated, preferably by pressure and vacuum, to remove excess liquor, thereby uniformly converting the cellulose to alkali cellulose. An effective steeping operation may be carried out according to Patent 2,614,102, of Reid Logan Mitchell. In such an operation we may apply to the sheet of cellulose a steeping liquor containing any suitable concentration, say from 10% to 50%, of sodium hydroxide, for example, about 20% of sodium hydroxide, to provide a steeped and pressed alkali cellulose sheet having extremely uniform alkalization and an analysis of about 35.5% cellulose and 17.25% sodium hydroxide. This uniformly alkalized sheet is then preferably passed continuously into a chamber in which ethylene oxide gas is forced through the moving sheet to effect uniform etherification to the preferred level of about 2.0% to 5.0% actual substitution. The expression "forced through," as used herein, with reference to the passing of the caustic steeping liquor or the ethylene oxide through the sheet refers to either forcing it through by pressure on the fluid or gas or to pulling it through by means of a vacuum, or both. The significant characteristic is that such a volume flows through the sheet that it does not become exhausted or depleted at any part of the sheet and reacts uniformly with all the fibers.

While we prefer to use the "force-through" process of said patent in producing alkali cellulose, alkalized cellulose produced from sheets of cellulose in steeping presses or by slurry steeping as now practiced in the viscose process can be used in our process provided precautions are taken to effect a high degree of uniform conversion. While various concentrations of sodium hydroxide varying from 5%–70%, preferably from 18%–22% for pressed alkali cellulose and 8%–14% in the liquid phase reactions, may be used in the alkalization step, uniformity of distribution is more important than the actual level of alkali. The alkali cellulose may be aged to depolymerize to the desired viscosity level (200–600 DP) either prior to or subsequent to etherification, if desired.

The alkali cellulose in crumb or shredded form may be fed, for example, through a variable pitch self-sealing screw, into a revolving chamber in which the loose charge of alkali cellulose is tumbled in an atmosphere of gaseous ethylene oxide to give the desired uniform level of substitution, then exited through another self-sealing screw into a mixer in which the hydroxyethylcellulose is dissolved in a sodium hydroxide solution. Varying amounts of ethylene oxide of the order of 4% to 20% may be reacted to provide levels of actual substitution, varying from 2% to 8%, preferably from 3% to 5%, and most effectively about 3%–4%, the uniformity of substitution being more critical than the level in the optimum range 3%–5%.

The uniformity substituted hydroxyethylcellulose produced according to our invention is dissolved in any suitable aqueous alkali solution, such as an aqueous solution of sodium hydroxide. The uniformly substituted hydroxyethylcellulose, with or without aging to reduce viscosity, is preferably dissolved in dilute sodium hydroxide, preferably at near 0° C., to yield a solution of hydroxyethylcellulose. The solution may contain from 4% to 15% of hydroxyethylcellulose at an average DP level of 200–600 and from 2% to 10% of alkali. One suitable solution contained about 8.0% hydroxyethylcellulose and about 7.0% sodium hydroxide. The solutions thus produced will filter very effectively, forming a clear liquid.

The filtered and clear solution of hydroxyethylcellulose can be precipitated to form filaments or cast into sheets by use of an acid precipitating bath of the general type used for the coagulation and regeneration of viscose. The bath may comprise from about 4% to about 15% sulfuric acid, from about 13% to about 25% of sodium sulfate, and from about 0% to about 15% of zinc sulfate. A solution containing about 12% sulfuric acid and 18% sodium sulfate is satisfactory. Preferably, the solution of hydroxyethylcellulose is introduced into the acid solution at a temperature around 25° to 65° C. When filaments are coagulated they can be treated in the spin bath or casting bath in a manner similar to the spinning of viscose solutions.

When films are to be produced, the alkaline solution of hydroxyethylcellulose is cast in any suitable way and may be done in the way viscose films are cast to form films of the type known as cellophane. The films formed by precipitation according to the invention are clear and strong without any sign of sliminess in the wet state. The solution of hydroxyethylcellulose may be cast over rotating cylinders on which the acid solution is applied, or it may be cast or printed onto a long endless belt such as an inert plastic or stainless steel and while on the belt immersed in the acid bath and subjected to any washing and after treatment required.

The films produced according to the invention are clear and strong and are suitable for general wrapping, packaging, etc. The film has excellent adhesion for all types of nitrocellulose or vinyl base coatings yielding a coated film having very superior moisture-resistant properties as well as sparkling clarity.

In one embodiment of our invention, we apply to the cellulose in any suitable form, for example, dry sheet, crumb or shreds, a water solution of sodium hydroxide and ethylene oxide. This solution may be forced through a continuously moving dry sheet in the manner previously described. In this embodiment of the invention, in which an aqueous solution of caustic soda and ethylene oxide is applied directly to the cellulose, the cellulose may advantageously be provided in a loose or flocked condition and is slurried at a low temperature, preferably below 5° C. in an aqueous solution containing the amounts of sodium hydroxide and ethylene oxide necessary to effect the requisite substitution of ethylene oxide on the cellulose. After the initial intermixing and uniform contact of the fibers with the solution, the mixture is warmed to effect the reaction, and after the reaction the product may be diluted by addition of water to reduce the concentration of sodium hydroxide to the level giving optimum dissolution, and then cooled to near 0° C. while stirring to effect solution. The resulting solution may be filtered in preparation for spinning filaments, or for casting into films. The solution of hydroxyethylcellulose in a solution of sodium hydroxide and water can be spun into filaments or cast into sheets by using any suitable acid precipitating bath as previously described.

Our invention contemplates the production of mixed cellulosic solutions of viscose and hydroxyethylcellulose and the precipitation of the resulting cellulosic product from the aqueous solution of sodium hydroxide, either as filaments or as sheets by means of an acid precipitating bath. This adaptation of our invention may be employed to produce filaments and sheets having special properties and at a lower cost than viscose filaments and sheets. One important property of sheets made from such filaments is that heat sealing coatings such as vinyl acetate or cellulose nitrate adhere very well to such sheets, and thereby eliminate the special treatment necessary to apply and anchor heat sealing coatings on regenerated cellulose sheets.

The following is an example of preparing hydroxyethylcellulose films according to our invention:

*Example I*

A continuous sheet of cellulose is steeped in 20% NaOH solution at 25° C. in an operation in which the solution is forced through the sheet to yield alkali cellulose of 35.0% cellulose and 17.2% NaOH in which each fiber is uniformly alkalized. The sheet of alkali cellulose is led into a chamber in which ethylene oxide gas is forced through the sheet of alkali cellulose in such a manner as to uniformly contact each fiber with ethylene oxide while effecting etherification to a uniform level of about 3%. The uniformly etherified sheet of hydroxyethylcellulose is then dissolved in dilute sodium hydroxide at near 0° C. to yield a solution of 8.0% hydroxyethylcellulose and 7.0% NaOH having a filtration plugging value of 500 unfrozen and 2,000 after freezing and thawing. This compares with a plugging value of less than 5 on unfrozen commercially available hydroxyethylcellulose and 20–50 for frozen commercially available hydroxyethylcellulose.

This solution of hydroxyethylcellulose, when cast, yields highly transparent films of about 200–400 DP with no appreciable loss of material. The films do not show the slimy characteristics exhibited by films prepared from commercial varieties of hydroxyethylcellulose. Gel reswelling values are also much lower than for other hydroxyethylcellulose films tested, e. g. 500 as compared with 900+. The dried film has high tear, flex and impact values on a level comparable with commercially available cellophane.

The following is an example of another method of preparing hydroxyethylcellulose according to our invention:

*Example II*

A 135 gram portion of short fibered cellulose is slurried at a low temperature (preferably below 5° C.) with 900 grams of an aqueous solution containing 135 grams of sodium hydroxide and 15 grams of ethylene oxide, then warmed to effect reaction. The mixture is then diluted to about 10% hydroxyethylcellulose (4% level of substitution) and 9% NaOH and cooled to near 0° C., while stirring, to effect solution.

Solution may alternatively be induced by freezing the reaction mixture, passing through a colloid mill or subjecting the suspension to ultrasonic treatment.

If desired, the cellulose may be preoxidized (according to U. S. patent application Serial No. 289,672, filed May 23, 1952, and now abandoned) to a DP of about 400.

Ethylene chlorohydrin may be substituted in the correct proportion for ethylene oxide.

*Example III*

A mass of cellulose is steeped in 20% NaOH at 25° C. and pressed to yield an alkali cellulose at a press ratio of about 2.6. The alkali cellulose is then shredded to yield a porous crumb and aged to a DP of about 400. The aged alkali cellulose crumb is placed in a reaction vessel, evacuated, and treated with ethylene oxide gas to effect a level of substitution of about 3.5%. The hydroxyethylcellulose is dispersed in water and NaOH to yield a solution of 8.0% hydroxyethylcellulose and 6.0% NaOH, having a plugging value of 450 unfrozen and 1800 after freezing and thawing.

An unfiltered portion of the above solution was cast into sheets and recovered in ethanol acidified with HCl. The films were washed salt-free with ethanol, dried and fractionated into water soluble, 5% caustic soluble and caustic insoluble portions. The water soluble material amounted to less than 1.0% and when recovered analyzed above 5% hydroxyethyl calculated as ethylene oxide. The 5% caustic soluble material amounted to more than 99.5% and analyzed about 3.1% hydroxyethyl. The 5% caustic insoluble material amounted to less than 0.5% and analyzed about 1% hydroxyethyl.

In contrast, a commercial variety of hydroxyethylcellulose of slightly higher level of substitution contained caustic insoluble material amounting to less than 0.5%, but had a water soluble component of 5.5% analyzing above 10% hydroxyethyl.

Another hydroxyethylcellulose made according to U. S. Patent 2,469,764 and fractionated in the same manner was found to contain caustic insoluble material amounting to 6.9%, also a water soluble component of 3.5% analyzing above 10% hydroxyethyl.

The analytical method used to determine the percentages of ethylene oxide substituted on the cellulose was a modification of the well-known Zeisel method (Monatshefte für Chemie 6,989; 7,406) for quantitatively estimating the number of methoxy and ethoxy groups in a compound based on the decomposition of simple ethers by hydriodic acid.

The alkyliodide so formed is passed into an alcoholic solution of silver nitrate and silver iodide is precipitated. The consumption of silver nitrate is estimated volumetrically. However, the estimation of a hydroxy-ethoxyl content by this method yields very low analyses since approximately half the groups present are liberated as ethylene and not ethyl iodide. Therefore, a modified procedure was used in which the silver nitrate trap for the ethyl iodide was followed by a bromine trap which collected the ethylene. A volumetric procedure was used to estimate the consumption of bromine. From the combined consumption of bromine and silver nitrate the hydroxyethyl content of the sample was calculated.

This application is a continuation-in-part of our application Serial No. 400,779, filed December 28, 1953, and now abandoned.

We claim:

1. The process of producing hydroxyethoxycellulose suitable to form strong filaments and clear tough films which comprises continuously passing a sheet of cellulose of indefinite length through an operation in which an aqueous solution of sodium hydroxide is continuously passed through the sheet in such volume as to effect uniform alkalization, said sheet being formed of cellulose having relatively uniform chain lengths, removing most of the excess aqueous solution adhering to the sheet, passing the continuously moving sheet of alkalized cellulose into a chamber in which ethylene oxide gas is forced through the moving sheet of alkalized cellulose to effect uniform etherification with the substitution of from about 2% to about 8% of ethylene oxide on the alkalized cellulose, the uniform alkalization and etherification resulting in hydroxyethoxycellulose which is substantially all soluble in a 5% aqueous sodium hydroxide solution at about 0° C. but substantially insoluble in water, and dissolving substantially all the hydroxyethoxycellulose in a dilute aqueous solution of sodium hydroxide at a temperature above the freezing point of the solution.

2. The process according to claim 1 in which about 3% to 5% of ethylene oxide is substituted on the alkali cellulose.

References Cited in the file of this patent

UNITED STATES PATENTS

| | | |
|---|---|---|
| 1,863,208 | Schorger | June 14, 1932 |
| 2,101,263 | Maxwell | Dec. 7, 1937 |
| 2,137,343 | Maxwell | Nov. 22, 1938 |
| 2,146,738 | Haskins | Feb. 14, 1939 |
| 2,148,952 | Maxwell | Feb. 28, 1939 |
| 2,172,109 | Reichel et al. | Sept. 5, 1939 |
| 2,191,894 | Meigs | Feb. 27, 1940 |
| 2,288,200 | Meyer | June 30, 1942 |
| 2,362,761 | Medl | Nov. 14, 1944 |
| 2,422,572 | Lilienfeld | June 17, 1947 |
| 2,466,799 | Fisher | Apr. 12, 1949 |
| 2,469,764 | Erickson | May 10, 1949 |

FOREIGN PATENTS

| | | |
|---|---|---|
| 503,862 | Great Britain | Apr. 17, 1939 |